United States Patent [19]

Furusawa et al.

[11] Patent Number: 4,663,736
[45] Date of Patent: May 5, 1987

[54] FILE DELETION SYSTEM IN A FILE UNIT

[75] Inventors: Mitsuji Furusawa; Osamu Ueno; Hideyuki Kobayashi, all of Tokyo, Japan

[73] Assignee: OKI Electric Co. Ltd., Tokyo, Japan

[21] Appl. No.: 680,538

[22] Filed: Dec. 11, 1984

[30] Foreign Application Priority Data

Dec. 13, 1983 [JP] Japan .................. 58-233630

[51] Int. Cl.⁴ ............................................ G06F 3/14
[52] U.S. Cl. .................................................. 364/900
[58] Field of Search ............... 364/200, 300, 900, 520, 364/189, 192; 340/721, 799, 709, 711, 718, 750, 798

[56] References Cited

U.S. PATENT DOCUMENTS

| 4,181,954 | 1/1980 | Rosenthal et al. | 364/520 |
| 4,202,041 | 5/1980 | Kaplow et al. | 364/900 |
| 4,435,777 | 3/1984 | McCaskill et al. | 364/900 |
| 4,464,719 | 8/1984 | Spellmann | 364/300 |
| 4,481,603 | 11/1984 | McCaskill et al. | 364/900 |
| 4,491,933 | 1/1985 | Ursln et al. | 364/900 |
| 4,520,454 | 5/1985 | Dufour et al. | 364/900 |

Primary Examiner—Gareth D. Shaw
Assistant Examiner—Randy W. Lacasse
Attorney, Agent, or Firm—Ratner & Prestia

[57] ABSTRACT

Deletion of a particular message in a file unit is accomplished for those messages with deletion set code in a file directory displayed on a screen. Operation of the deletion of a message includes (a) depression of a "deletion" key for indicating a file directory on a screen, (b) designating messages to be deleted by depression of a deletion set/reset key to change a deletion set/reset code to a set code, and (c) execution of deletion by the depression of a "deletion execution" key to delete a message with said deletion set code. A file directory indicated on a screen includes a deletion set/reset code, a message number, nature of a message, length of a message, and first 60 characters of a message, which simplifies identification of a message to be deleted.

4 Claims, 8 Drawing Figures

```
 *FILE  DIRECTORY-ALL  ---TITLE
1*[*]01 P(001):THE  QUICK  BROWN---
2 *02 S(010):MT-100 VSR TELEP---
3 *03 R(100):A B C D E F G H I J K L M N O P
4
⋮
 *10 P(200):X Y Z
 END
```

FILE DELETION SYSTEM IN A FILE UNIT

BACKGROUND OF THE INVENTION

The present invention relates to a file deletion system which deletes designated messages in a file memory like a floppy disc. The present invention is useful in applying to a telex terminal, a word processor, and/or a personal computer.

Figure 1A:
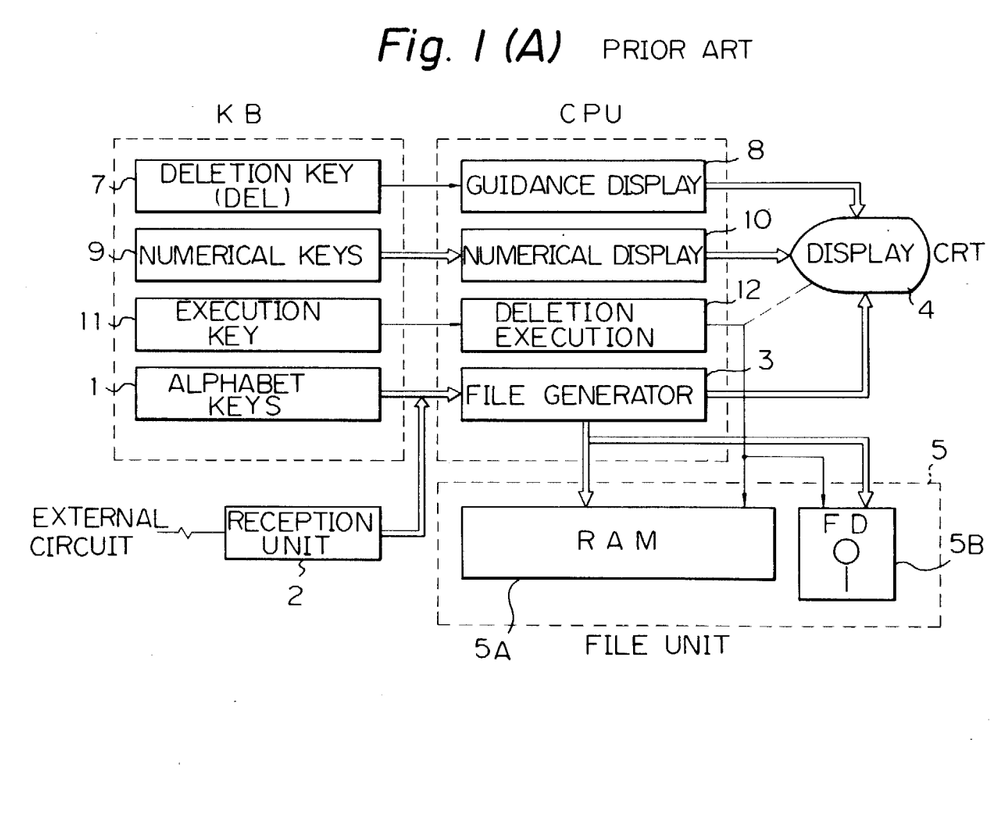
FIG. 1A is a block diagram of a prior file deletion system.

A conventional file deletion system is shown in FIG. 1A, in which KB shows a keyboard, CPU shows a programmed processor, CRT shows a cathode ray tube screen, File unit shows a file device like a floppy disc unit, the reference numeral 1 is alphabet keys for generation of a message, 2 is a reception unit which receives a message from a line, 3 is a file generator for generating a file which is to be stored in a file device (a floppy disc (FDD), or a random access memory (RAM), 4 is a screen for indicating input data and guidance information, 5 is a file unit having random access memory 5A for storing a file, and a floppy disc 5B for storing files, 7 is a deletion key for designating deletion of a file, 8 is a guidance display means for displaying guidance information on the screen 4, 9 is a set of numerical keys for designating the number of a file to be deleted, 10 is numerical display control for displaying numbers of files to be deleted, 11 is an execution key for execution of deletion of the designated message, and 12 is deletion execution means for executing the deletion of a designated message on a RAM or a floppy disc.

When a new message is provided by alphabet keys 1 or a reception unit 2, the file generator 3 designates an available file number, and input data is displayed on the screen 4. Then, the message is registered in the file unit with the designated file number. Thus, a plurality of files are generated in a file unit 5 (a floppy disc).

Figure 1B:
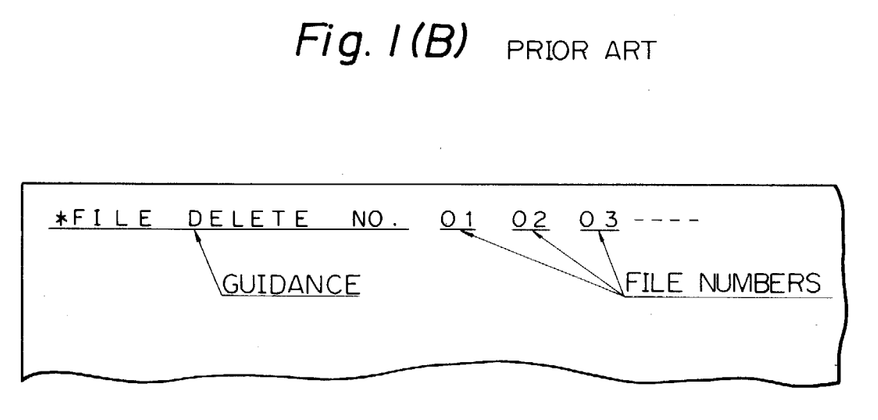
FIG. 1B shows a display by the apparatus of FIG. 1B.

When it is desired to delete a message on a file unit 5, an operator depresses a deletion key 7, then, the guidance display means 8 displays the guidance information on the screen 4. The example of the guidance information is shown in FIG. 1B. Then, the operator depresses the numeric keys to designate the number of the message to be deleted. That number is informed to the numeral display control 10, which displays the number of the message to be deleted on the screen 4. When a plurality of message are deleted simultaneously, a plurality of numbers are indicated as shown in FIG. 1B. After the numbers of the messages to be deleted are indicated on the screen 4, the operator depresses the execution key 11, then, the deletion of the designated messages is carried out. The deletion execution means 12 reads the number to be deleted indicated on the screen 4.

Accordingly, the conventional file deletion system shown in FIGS. 1A and 1B has the disadvantages that the message is identified by merely the file number and therefore the operator must have a list of messages to check the message number and the content of the message, and incorrectly deleting a message which should not be erased occurs frequently.

SUMMARY OF THE INVENTION

It is an object, therefore, of the present invention to overcome the disadvantages and limitations of a prior file deletion system by providing a new and improved file deletion system.

It is also an object of the present invention to provide a file deletion system which indicates not only a message number, but also part of the content of the message to be deleted.

It is a further object of the present invention to provide a file deletion system which designates a message to be deleted not by a message number, but by a line of a message directory which shows the nature of the message in detail.

The above and other objects are attained by a file deletion system for erasing a message in a file unit comprising a keyboard having at least a deletion key (7), a deletion set/reset key (7a), and execution key (11), cursor shift keys (13), and some alphanumerical keys; a file generator means for generating a file directory, wherein said file directory consists of a list of files containing at least said particular message; a display means for indicating said list of said file directory containing said particular message; file directory control means for indicating said list of said file directory on said display means upon depression of said deletion key (7), said file directory including at least a deletion set/reset code and an initial group of characters of each message reflecting the content of said message; a cursor control means for shifting a cursor up and down on said display means upon depression of said cursor shift keys (13), and indicating a cursor on said deletion set/reset code of a first message upon depression of said deletion key (7); a deletion set/reset control means for changing said set/reset code under the cursor upon depression of said deletion set/reset key (7a) between set code and reset code; a deletion execution means for deleting a message in said file unit designated by the file directory with deletion set code upon depression of said execution key (11).

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 2:
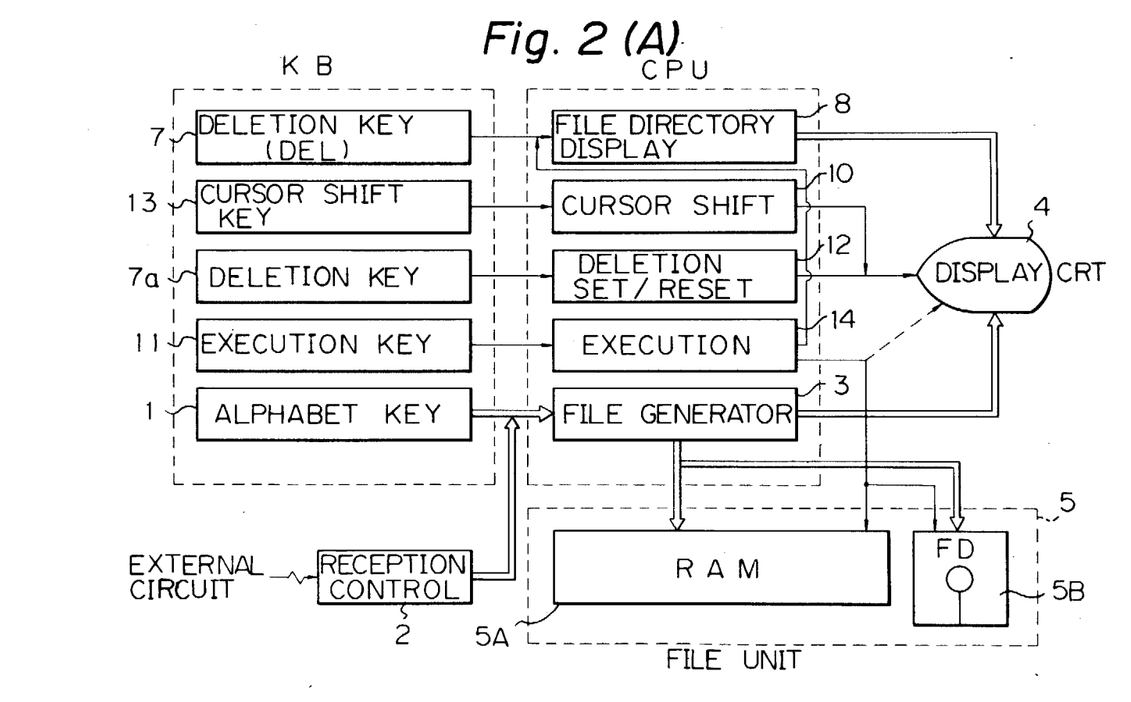
FIG. 2A shows a block diagram of the file deletion system according to the present invention.
FIG. 2B shows an example of a display by the apparatus of FIG. 2A.
Figure 2B:
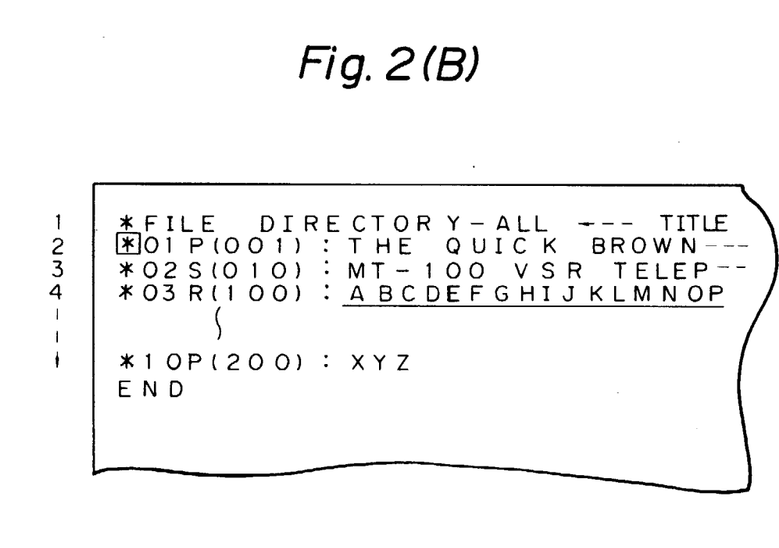
Figure 3:
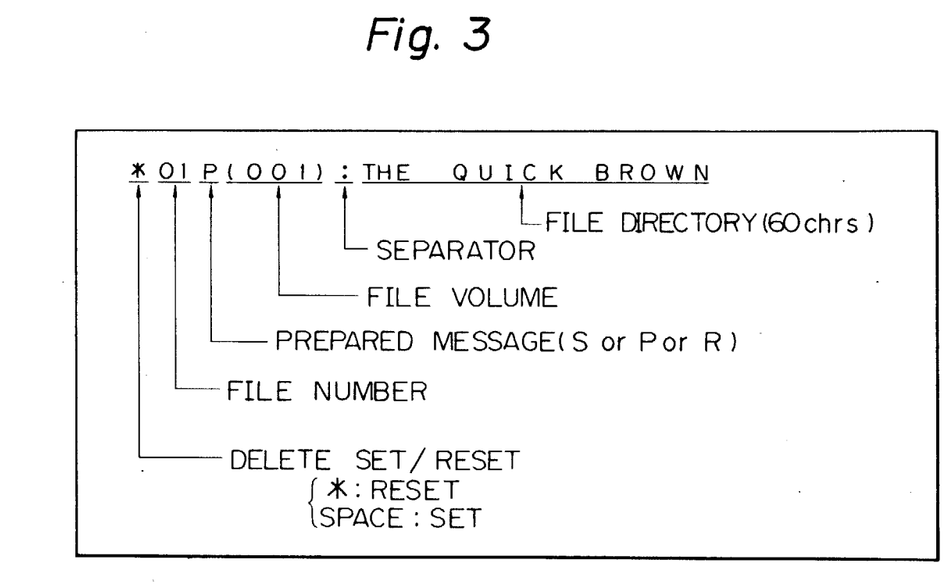
FIG. 3 shows an example of a display in detail according to the present invention.
Figure 4:
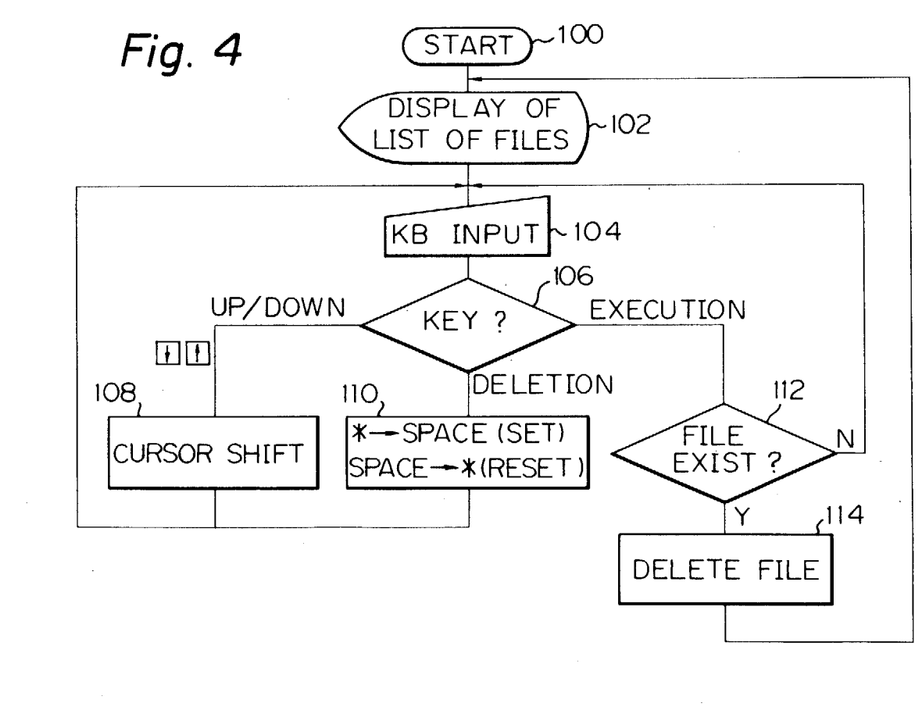
FIG. 4 shows a flow diagram of the operation of the present file deletion system.
Figures 5, 5A:
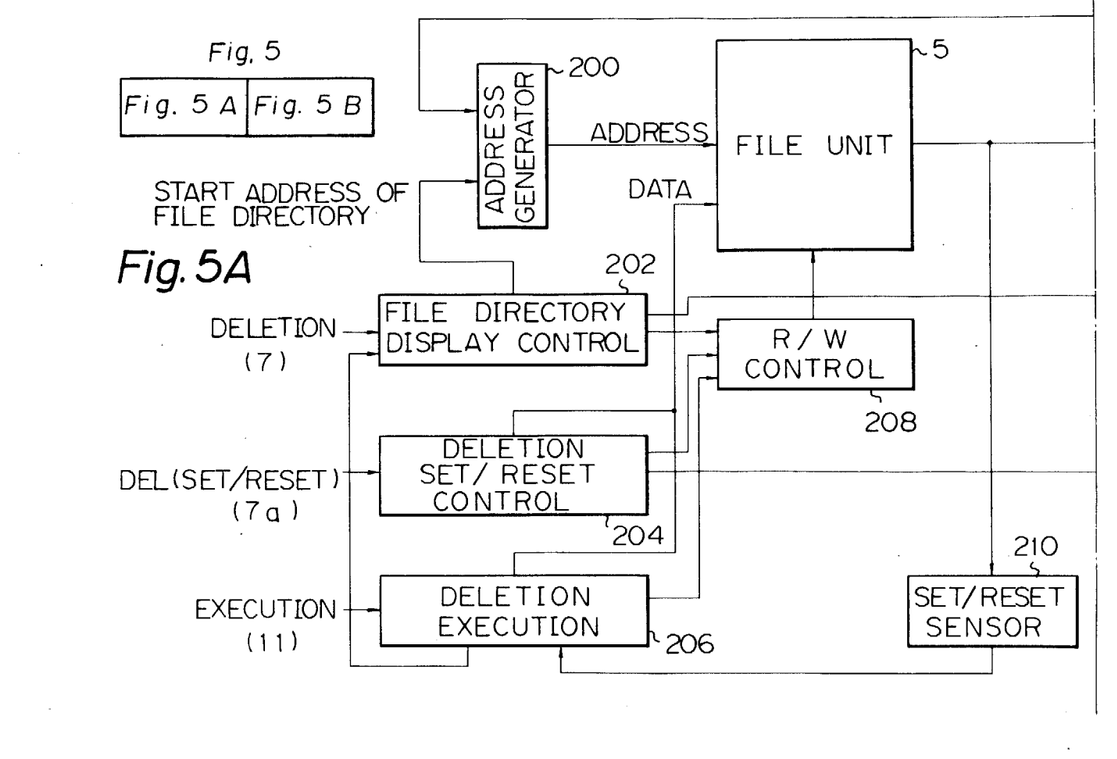
FIGS. 5A and 5B is another block diagram of the file deletion system according to the present invention.
Figure 5B:
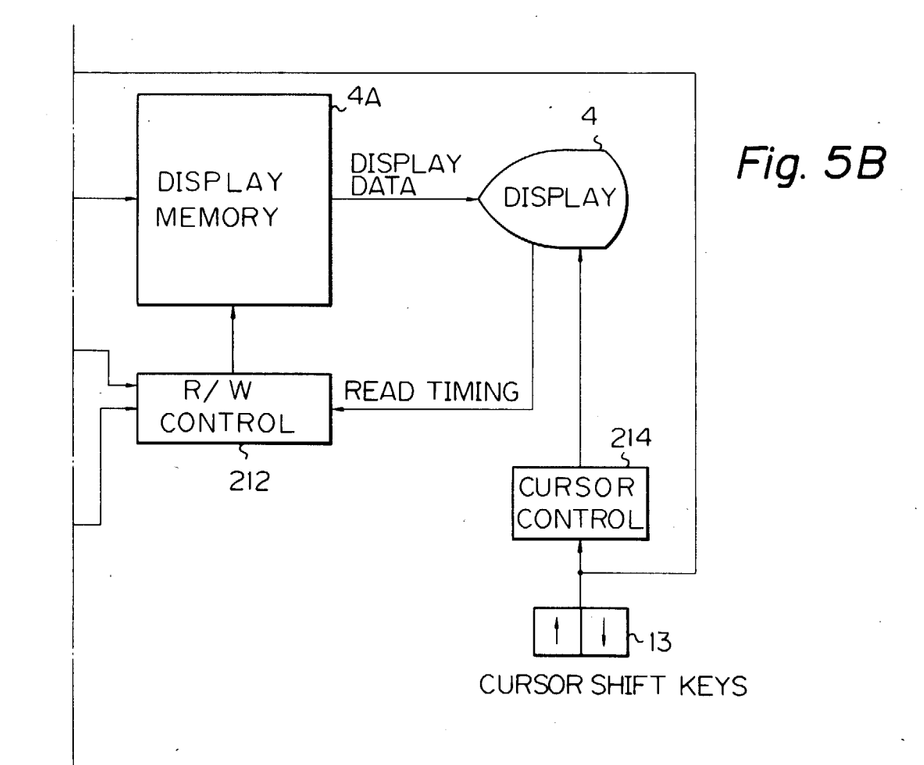

FIG. 2A shows a block diagram of the file deletion system which operates with a programmed computer, FIG. 2B shows an example of a display, FIG. 3 shows an example of a display in detail, FIG. 4 shows a flow diagram of the operation of the present file deletion system, and FIG. 5 shows a block diagram of the present file deletion system which operates with hardware.

In FIG. 2A, the numerals 1 through 7 show the same members as those of FIG. 1A. The CPU (central processing unit) is programmed so that it has the following functions; a file directory display function 8 which displays a file directory of the file unit 5 on the screen 4 according to the depression of the deletion key 7; a cursor shift function 10 to shift a cursor on the screen according to the cursor shift keys 13 (an up key, and a down key); a deletion set/reset function 12 which sets or resets a deletion code on the screen 4 according to the depression of the deletion key 7a; an execution function 14 which executes the actual deletion of a designated message upon depression of the execution key 11; and a file generation function 3 which is the same as the conventional one on FIG. 1A.

The keyboard KB has the deletion key (DEL) 7, 7a for entering the file deletion operation, and sets/resets the deletion of the files, the cursor shift keys 13 (an up key, and a down key), an execution key 11 for the actual execution of the deletion.

The deletion key 7a may double as the other deletion key 7. Of course, the keyboard KB has the alphabet keys (data keys) 1.

When the particular message which is stored in the file unit 5 is to be deleted, an operator depresses the deletion key (DEL) 7, then, the file directory display function 8 displays the file directory of the messages stored in the file unit 5 (box 102 in FIG. 4). The format of the display is shown in FIG. 2B briefly, and is shown in detail in FIG. 3, in case of a telex terminal.

In FIG. 2B, or FIG. 3, the first line (*FILE DIRECTORY -ALL) shows merely the title of the display. Each line of the display except the first line has the set/reset code (* or space). When that code is *, then, the message following the symbol * on the line is not deleted, and when that code is space, then, the message following the code is to be deleted by the next operation. That code (* or space) is changed alternately by depressing a deletion key 7a. The second term of the file directory (01, 02, ---, 10) shows the file number. The next one bit code (P or S or R) shows the attribute or the nature of the message in case of a telex terminal, when the attribute code is "P", the message is the prepared message which is to be transmitted, when the code is "S", the message is the message which has been sent already, and when the code is "R", the message is the reception message).

The next figures between the parenthesis show the file volume or the length of the message and how many lines the message has. The next code ":" is merely a separator on the screen. Following the separator ":", the first 60 characters of the message are displayed.

Accordingly, the file directory thus displayed according to the present invention gives the detailed information of the message as compared with that of the prior display of FIG. 1B, and an operator can recognize and identify the message only using the display.

When the file directory is displayed, the cursor is located at the first line of the message, and at the extreme left column on the set/reset code as shown by the rectangular box in FIG. 2B.

At the end of the file directory display, the code, (END) is displayed to show the end of the display (see FIG. 2B).

Now, it is assumed that the message No. 03 which is the reception message, having 100 lines, with the initial characters (ABCDEFGHIJK---), is to be deleted.

In that case, the operator depresses the down key (cursor shift key 13) twice so that the cursor shifts to the fourth line which shows the message (03) from the second line on which the cursor located (the operation is shown in FIG. 4 by the box 104, through the boxes 106, 108 to the box 104). Then, the cursor shift function 10 (FIG. 2A) shifts the cursor by two lines downwards.

Next, the operator depresses the deletion set/reset key (DEL) 7a, then, the deletion function 12 changes the set/reset code at the top of the fourth line from (*) to the space which indicates that the message is to be deleted. Designation of the deletion of a plurality of messages is possible by changing a plurality of (*) codes to the space codes. If the deletion key 7a is depressed again, the space code returns to (*) code which shows that the message is not to be deleted. Therefore, the depression of the deletion key 7a switches the message indicated by the cursor between the deletion message and the no-deletion message. The operation of the depression of the deletion key 7a is shown by the path with the boxes 104, 106 and 110 in FIG. 4.

Next, the operator depresses the execution key 11, then, the execution function 14 executes the deletion of the messages which have the space code at the set/reset code location. In the present embodiment, the message 03 is deleted. After the completion of the deletion, the new file directory which does not include the deleted messages is displayed on the screen. The operation of the depression of the execution key 11 is shown by the path with the boxes 104, 106, 112, and 114 in FIG. 4.

The above operation is carried out either by a programmed computer as shown in FIG. 2A, or a hardware configuration as shown in FIG. 5. In FIG. 5, the numeral 4 is a display, 4A is a display memory, 5 is a file unit, 13 is cursor shift keys (an up key and a down key), 200 is an address generator for providing address information to the file unit 5, 202 is a file directory display control, 204 is a deletion set/reset control, 206 is a deletion execution control, 208 is a read/write control for the file unit 5, 210 is a set/reset sensor which detects if the set/reset code of each message in the file unit has the deletion code (space) or the non-deletion code (*), 212 is a read/write control for the display memory 4A, 214 is a cursor control for location of the cursor on the screen 4, according to the depression of the cursor shift keys 13.

In operation, upon depression of the deletion key 7, the file directory display control 202 reads the file directory in the file unit, and the file directory thus read out is written in the display memory 4A, the content of which is displayed on the screen 4. The cursor is located at the left end of the first message as shown in FIG. 2B.

Then, upon the depression of the cursor shift keys 13, the cursor shifts upward or downward. With the shift of the cursor, the address generator 200 provides the address at which the message designated by the cursor is stored.

Then, upon the depression of the deletion set/reset key 7a, the deletion set/reset control 204 substitutes the (*) code to the space, and substitutes the space to (*) code both in the file memory 5 and the display memory 4A.

Next, upon depression of the execution key 11, the deletion execution control 206 deletes the messages with the deletion code (space) in the file unit 5. After the deletion of the message, the new file directory is displayed on the screen 4.

Accordingly, it should be appreciated that the message to be deleted is indicated not only with the file number, but also with the initial 60 characters of the file, and therefore, an operator can identify the message to be deleted. Also, the message to be deleted is designated by a set/reset code (*, or space) on each line. Therefore, the mistake of the designation of a deletion message is prevented.

From the foregoing, it will now be apparent that a new and improved file deletion system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A data processing system comprising a file deletion system for deleting a particular message stored in a file unit comprising;
    a keyboard having at least a deletion key (7), a deletion set/reset key (7a), an execution key (11), cursor shift keys (13), and some alphanumerical keys, file generator means for generating a file directory, wherein said file directory comprises a list of files containing at least said particular message,
    a display means for indicating said list of said file directory containing said particular message,
    a file directory control means for indicating said list of said file directory of messages on said display means upon depression of said deletion key (7), said file directory includes at least a deletion set/reset code and an initial group of characters of each message reflecting the content of said message,
    a cursor control means for shifting a cursor up and down on said display means upon depression of said cursor shift keys (13), and initiating a cursor location on said deletion set/reset code of a first message upon depression of said deletion key (7),
    a deletion set/reset control means for changing said set/reset code under the cursor upon depression of said deletion set/reset key (7a) between set code and reset code,
    a deletion execution means for deleting a message in said file unit designated by the file directory with deletion set code upon depression of said execution key (11).

2. A file deletion system according to claim 1, wherein a single key which functions as both said deletion key and said deletion set/reset key is provided in said keyboard.

3. A file deletion system according to claim 1, wherein a file directory of each message is indicated in one line on the display means.

4. A file deletion system according to claim 1, wherein said file unit has a floppy disc unit.

* * * * *